United States Patent [19]

Flax

[11] Patent Number: 4,814,806
[45] Date of Patent: Mar. 21, 1989

[54] CAMERA LENS CAP HOLDER

[76] Inventor: Arthur M. Flax, 22300 Leewright Ave., Southfield, Mich. 48034

[21] Appl. No.: 177,189

[22] Filed: Apr. 4, 1988

[51] Int. Cl.$^4$ .................. G03B 11/04; G02B 23/16
[52] U.S. Cl. ................................... 354/295; 354/82; 350/587; 224/908
[58] Field of Search .................. 354/82, 293, 295; 350/587; 224/908

[56] References Cited

U.S. PATENT DOCUMENTS

| 3,884,403 | 5/1975 | Brewer | 224/908 |
| 3,942,864 | 3/1976 | Numbers | 350/587 |
| 4,131,147 | 12/1978 | Schrage | 224/908 |
| 4,327,960 | 5/1982 | Gould | 350/587 |
| 4,637,535 | 1/1987 | Aleman | 224/908 |
| 4,645,321 | 2/1987 | Fukita | 354/82 |

*Primary Examiner*—A. A. Mathews
*Attorney, Agent, or Firm*—Charles W. Chandler

[57] ABSTRACT

A lens cap holder for a camera lens includes an identification panel releasably connected to the camera neck strap, and fabric fastener means for temporarily connecting the lens cap to the panel when the camera is being used so as not to interfere with the camera operation.

5 Claims, 1 Drawing Sheet

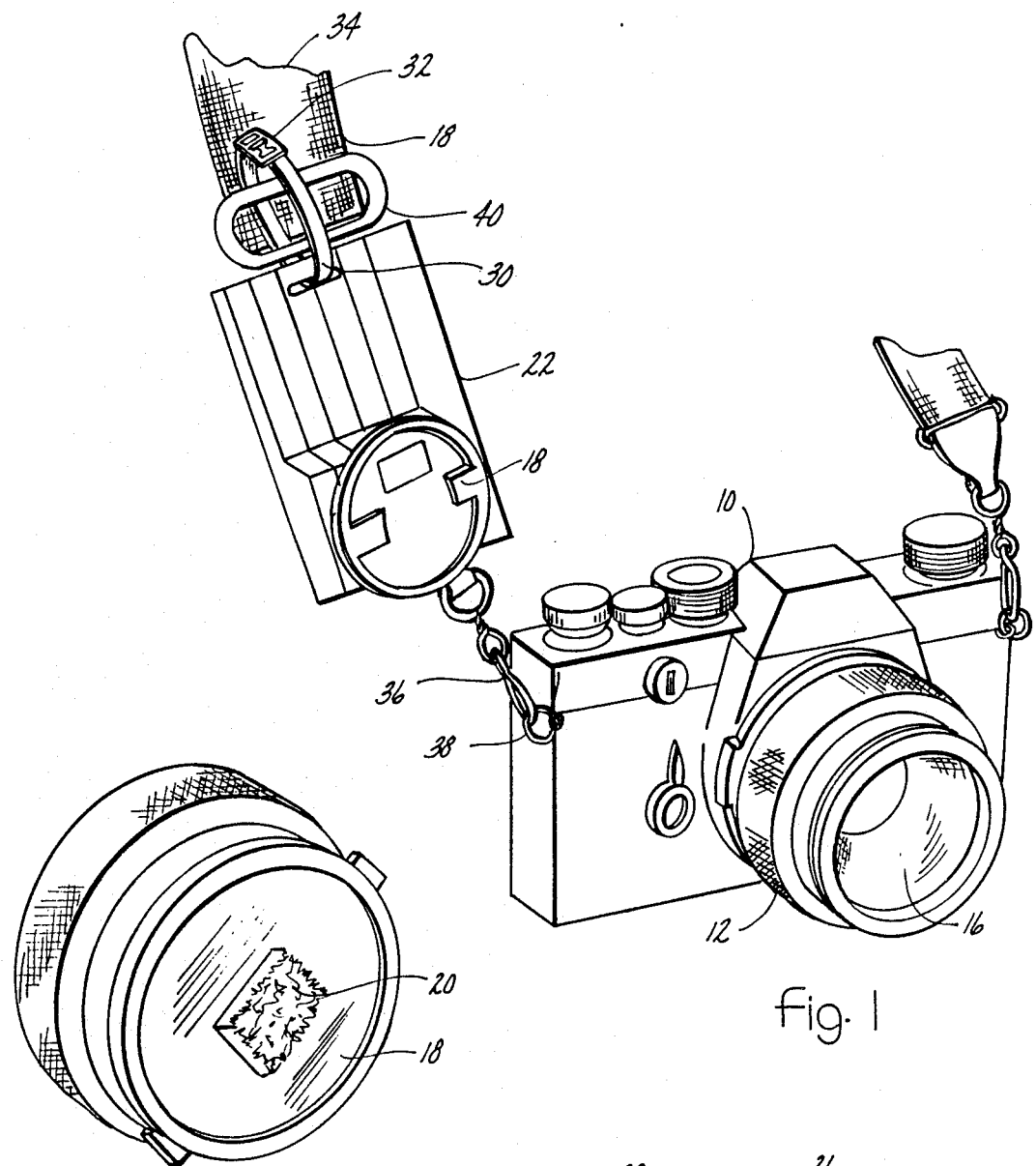
fig. 1
fig. 2
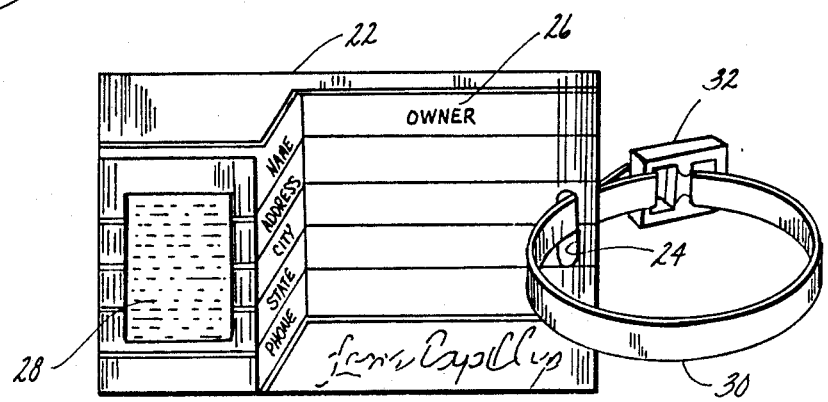
fig. 3

CAMERA LENS CAP HOLDER

BACKGROUND OF THE INVENTION

This invention is related to camera lens cap holders, and more particularly to a lens cap holder useful for temporarily connecting both the lens cap and an identification card to the neck strap when the camera is being used.

Lens caps are commonly mounted on cameras to protect the lens. A problem with such devices is that they are relatively expensive, and easy to lose or misplace when the camera is being used. A common solution is to connect the lens cap to an elastic strap having a loop mounted around the lens housing. The cap hangs below the camera and may interfere with its use.

Another approach is disclosed in U.S. Pat. No. 4,131,147 which issued Dec. 26, 1978 to Linus Schrage. The Schrage device employs a lens cap mount secured to the rear wall of the camera case.

A drawback with conventional commercial devices is that they can be used to hold only a particular lens cap.

SUMMARY OF THE INVENTION

The broad purpose of the present invention is to provide a holder for a lens cap which includes a Velcro fastener connected either to the camera neck strap or to another location, remote from the camera. One half of the fastener is mounted on a plastic identification panel on which the user can indicate ownership information of the camera.

The lens cap has the complementary half of the Velcro fastener so that the cap can be secured to the panel when the camera is being used, or mounted on the lens frame when the lens is not being used. This permits the user to temporarily store the lens cap in any convenient location remote from the camera lens depending upon where he mounts the identification panel.

Another special advantage is that the photographer can adapt a number of lens caps for use with a single holder. The lens holder can be packaged with several fabric strips for several lens caps, and sold for about the same price as commercially available single lens cap holders.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a perspective view of a camera showing the lens cap connected to the lens cap holder and identification panel to illustrate the preferred embodiment of the invention;

FIG. 2 is an enlarged fragmentary view of a camera lens with the cap mounted over the lens; and FIG. 3 is a view of the lens holder removed from the strap.

DESCRIPTION OF THE PREFERRED EMBODIMENT

Referring to the drawing, FIG. 1 illustrates a conventional 35 mm camera case 10 having a tubular interchangeable lens housing 12 supporting a conventional lens 16.

A conventional lens cap 18 is illustrated in FIG. 2 mounted on the lens housing to protect the camera lens. A section of a Velcro fabric loop fastener 20 is attached by any suitable means, such as by an adhesive, to cap 18.

A plastic identification panel 22 has a slot 24, as illustrated in FIG. 3. One side of identification panel 22 has indicia 26 indicating useful information, such as the owner of the camera. The information side of the panel is coated with or constructed of a material that permits the information to be written on the surface of the panel, such as the plastic or paper laminate used on common credit cards. The information can also be applied by other means such as an adhesive label or within a laminated structure.

A section of a complementary fabric fastener 28, adapted to mate with fastener 20, is attached to the identification panel.

A strap 30 of a plastic material, having buckle means 32, is looped through slot 24.

A conventional neck strap 34 is connected by a snap 36 to an eyelet 38 mounted on the camera case housing. Strap 32 has an adjustment buckle 40.

Strap 30 is looped through belt adjustment buckle 40. It can also be looped around the camera neck strap or through one of the many other buckles and clips common to modern camera accessories. Thus the identification panel is removably connected to the neck strap in a position remote from the camera lens.

As illustrated in FIG. 1, the lens cap is mounted on the identification panel by interengaging the two Velcro fabric fasteners so that the lens cap does not interfere with the operation of the camera and is also remotely mounted from the camera lens. Further, the identification panel can be used for several different cameras simply by disconnecting strap 30 from strap 34 and mounting the panel on another accessory. Another lens cap, for a different lens, can be mounted on identification panel 22. Strap 30 can also be connected to another suitable location either on strap 34, or the camera housing, or to other temporary mounting positions.

One important feature of the invention is that the lens cap holder can easily be attached or removed from one camera location or camera apparatus to another.

A rigid releasable fastener, such as a metal spring clip can be substituted for strap 30 and buckle 32.

Another important feature of the lens cap holder is that it can be used with any number of lens caps. Other lens caps can also be equipped with a complementary strip of hook or loop fastener so that they can be secured to the lens cap holder.

In summary, this invention allows a lens cap to be secured in a location that does not interfere with the operation of a camera. Many modern cameras are equipped with interchangeable lenses and this invention allows lens caps from other lenses to be secured. Further, the identification and holding panel can be used for several cameras simply by disconnecting strap 30 from buckle 40 and remounting the panel on another camera apparatus. The identification and holding panel can also be mounted in any suitable location on a camera strap or camera assembly as preferred by the photographer.

Having described my invention I claim:

1. For use with a camera having a case with a lens housing, a lens and a strap means connected to the camera case, the combination comprising:

a lens cap adapted to removably mate with the lens housing to cover the lens;

a panel member, and elongated flexible connector means for releasably connecting the panel member to the camera or strap means such that the panel member is remote from the camera lens;

a first fabric fastener attached to the lens cap; and a second fabric fastener attached to the panel and adapted to releasably engage the first fabric fastener, for supporting the lens cap in a position remote from the camera as it is being used.

2. A combination as defined in claim 1, in which the panel has identification indicia thereon.

3. A combination as defined in claim 1, in which said connector means includes a buckle for releasably connecting the panel to the camera strap means.

4. A combination as defined in claim 1, in which the panel has identification indicia and a section onto which identification information may be entered.

5. A combination as defined in claim 1, in which the connector means includes a releasable buckle for connecting the panel to another camera.

* * * * *